United States Patent
Sano et al.

(10) Patent No.: US 12,424,715 B2
(45) Date of Patent: Sep. 23, 2025

(54) METHOD FOR MANUFACTURING SECONDARY BATTERY

(71) Applicant: PRIME PLANET ENERGY & SOLUTIONS, INC., Tokyo (JP)

(72) Inventors: Hideki Sano, Ikeda (JP); Daisuke Nishide, Kobe (JP); Shigeki Matsuta, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 492 days.

(21) Appl. No.: 17/994,990

(22) Filed: Nov. 28, 2022

(65) Prior Publication Data

US 2023/0282951 A1    Sep. 7, 2023

(30) Foreign Application Priority Data

Nov. 30, 2021    (JP) .................................. 2021-194885

(51) Int. Cl.
*H01M 50/618*    (2021.01)
*H01M 4/02*    (2006.01)
*H01M 4/13*    (2010.01)
*H01M 10/0587*    (2010.01)
*H01M 50/46*    (2021.01)

(52) U.S. Cl.
CPC ........... *H01M 50/618* (2021.01); *H01M 4/13* (2013.01); *H01M 10/0587* (2013.01); *H01M 50/461* (2021.01); *H01M 2004/028* (2013.01)

(58) Field of Classification Search
CPC .... H01M 50/618; H01M 50/461; H01M 4/13; H01M 10/0587
See application file for complete search history.

(56) References Cited

U.S. PATENT DOCUMENTS

| | | |
|---|---|---|
| 2016/0268626 A1 | 9/2016 | Ishida |
| 2017/0005360 A1 | 1/2017 | Ishibashi et al. |
| 2017/0256822 A1 | 9/2017 | Onoda |
| 2018/0131029 A1 | 5/2018 | Watanabe et al. |

FOREIGN PATENT DOCUMENTS

| | | |
|---|---|---|
| EP | 3082181 A1 | 10/2016 |
| JP | 2002-063939 A | 2/2002 |
| JP | 2003-217669 A | 7/2003 |
| JP | 2007-165170 A | 6/2007 |
| JP | 2015-088280 A | 5/2015 |
| JP | 2016-058153 A | 4/2016 |
| JP | 2021-163665 A | 10/2021 |
| WO | WO 2015/064060 A1 | 5/2015 |
| WO | WO 2015/087618 A1 | 6/2015 |
| WO | WO 2016/167116 A1 | 10/2016 |

*Primary Examiner* — Sarah A. Slifka
(74) *Attorney, Agent, or Firm* — Finnegan, Henderson, Farabow, Garrett and Dunner LLP (57) ABSTRACT

Provided is a technology capable of improving the impregnation efficiency of an electrolyte into an electrode body. In accordance with a preferable one embodiment of a method for manufacturing a secondary battery herein disclosed, a method for manufacturing a secondary battery including an electrode body, an electrolyte, and a battery case is provided. The manufacturing method includes a solution introducing step of introducing the electrolyte into the battery case, and a pressure reducing step of reducing the pressure in the battery case after the solution introducing step. After an elapse of 10 hours or more after the solution introducing step, the pressure reducing step is carried out.

6 Claims, 4 Drawing Sheets

METHOD FOR MANUFACTURING SECONDARY BATTERY

CROSS REFERENCE TO RELATED APPLICATIONS

The present application claims priority based on Japanese Patent Application No. 2021-194885 filed on Nov. 30, 2021, the entire contents of which are incorporated by reference in the present specification.

BACKGROUND OF THE DISCLOSURE

1. Technical Field

The present disclosure relates to a method for manufacturing a secondary battery.

2. Background

A secondary battery such as a lithium ion secondary battery has been widely used in various fields of a vehicle, a portable terminal, and the like. This kind of secondary battery includes, for example, an electrode body of a power generating element, an electrolyte, and a battery case for accommodating the electrode body and the electrolyte. Japanese Patent Application Publication No. 2007-165170 and WO 2015/087618 each disclose one example of a method for manufacturing a secondary battery. The above-mentioned documents each disclose the procedure for introducing an electrolyte into a battery case accommodating an electrode body therein.

SUMMARY OF THE INVENTION

Incidentally, the electrolyte introduced into the battery case is desirably impregnated in the electrode body with more efficiency.

The present invention was completed in order to solve the problem. It is an object of the present invention to provide a technology capable of improving the impregnation efficiency of the electrolyte into the electrode body for manufacturing a secondary battery.

The technology herein disclosed provides a method for manufacturing a secondary battery including an electrode body including a positive electrode sheet, a negative electrode sheet, and a separator arranged between the positive electrode sheet and the negative electrode sheet, an electrolyte, and a battery case for accommodating the electrode body and the electrolyte. The manufacturing method has a solution introducing step of introducing the electrolyte into the battery case, and a pressure reducing step of reducing the pressure in the battery case after the solution introducing step. After an elapse of 10 hours or more after the solution introducing step, the pressure reducing step is carried out.

With the method for manufacturing a secondary battery, the pressure reducing step is carried out after the solution introducing step, thereby exhausting the gas remaining in the electrode body to the outside. As a result, the difference in pressure between inside and outside the electrode body can be increased. Then, the impregnation rate of the electrolyte in the electrode body can be increased, which can improve the impregnation efficiency.

Further, in accordance with a preferable one aspect of the manufacturing method herein disclosed, the electrode body is a wound electrode body obtained by winding the positive electrode sheet in a band shape, the negative electrode sheet in a band shape via the separator in a band shape. For the wound electrode body, a long time may be taken for the impregnation of the electrolyte. For this reason, the technology herein disclosed is preferably applied thereto.

Further, in accordance with another preferable aspect of the manufacturing method herein disclosed, the positive electrode sheet includes positive electrode current collecting foil, and a positive electrode active material layer provided on the positive electrode current collecting foil. The width of the positive electrode active material layer in a transverse direction of the positive electrode sheet is 20 cm or more. With such a configuration, it is possible to manufacture a secondary battery with a larger capacity. Further, for the electrode body including a positive electrode sheet with the width of the positive electrode active material layer falling within the foregoing range, a longer time can be taken for the impregnation of an electrolyte. For this reason, the technology herein disclosed is preferably applied thereto.

Further, in accordance with a still other preferable aspect of the manufacturing method herein disclosed, adhesion layers are provided on both the surfaces of the separator. The adhesion layer bonds the positive electrode sheet and the separator, and bonds the negative electrode sheet and the separator. With such a configuration, it is possible to improve the productivity of the secondary battery. Further, for the electrode body including a separator provided with the adhesion layer, a longer time can be taken for the impregnation of an electrolyte. For this reason, the technology herein disclosed is preferably applied thereto.

Still further, in accordance with a still other aspect of the manufacturing method herein disclosed, the method includes reducing the pressure in the battery case to 5 kPa or less in terms of absolute pressure before the solution introducing step. With such a configuration, the effect of the technology herein disclosed can be preferably implemented.

Further, in accordance with a still further aspect of the manufacturing method herein disclosed, at the pressure reducing step after the solution introducing step, the pressure in the battery case is reduced down to 5 kPa to 50 kPa in terms of absolute pressure. With such a configuration, the effect of the technology herein disclosed can be preferably implemented.

DETAILED DESCRIPTION OF THE PREFERRED EMBODIMENTS

Below, referring to the accompanying drawings, some preferable embodiments of the technology herein disclosed will be described. The embodiments herein described are naturally not intended to particularly limit the present invention. The technology herein disclosed is not limited to the embodiments herein described unless otherwise mentioned. Each drawing is drawn schematically, and does not necessarily reflect the actual product. Further, the members/portions producing the same action are appropriately given the same reference number and sign, and an overlapping description thereon will be omitted. Incidentally, matters necessary for executing the technology herein disclosed, except for matters specifically referred to in the present specification (e.g., the general configuration and manufacturing process of a secondary battery not characterizing the technology herein disclosed) can be grasped as design matters of those skilled in the art based on the related art in the present field. The technology herein disclosed can be executed based on the contents disclosed in the present specification, and the technical common sense in the present field. Further, the expression "A to B" indicating the numerical value range in the present specification means "A or more and B or less", and embraces even the case of more than A and less than B.

In the present specification, the term "secondary battery" is a term denoting an electric storage device capable of repeatedly charging and discharging in general, and is a concept including a so-called storage battery (chemical battery) such as a lithium ion secondary battery or a nickel hydrogen battery, and a capacitor such as an electric double layer capacitor.

A reference sign X in each drawing referred to in the present specification represents the "depth direction", a reference sign Y represents the "width direction", and a reference sign Z represents the "height direction". Further, F in the depth direction X represents the "front", and Rr represents the "rear". L in the width direction Y represents the "left", and R represents the "right". Then, U in the height direction Z represents the "up", and D represents the "down". However, these are each merely the direction for convenience of description, and should not be construed as limiting the setting form of the secondary battery and the secondary battery assembly in the manufacturing step of the secondary battery at all.

Figure 1:
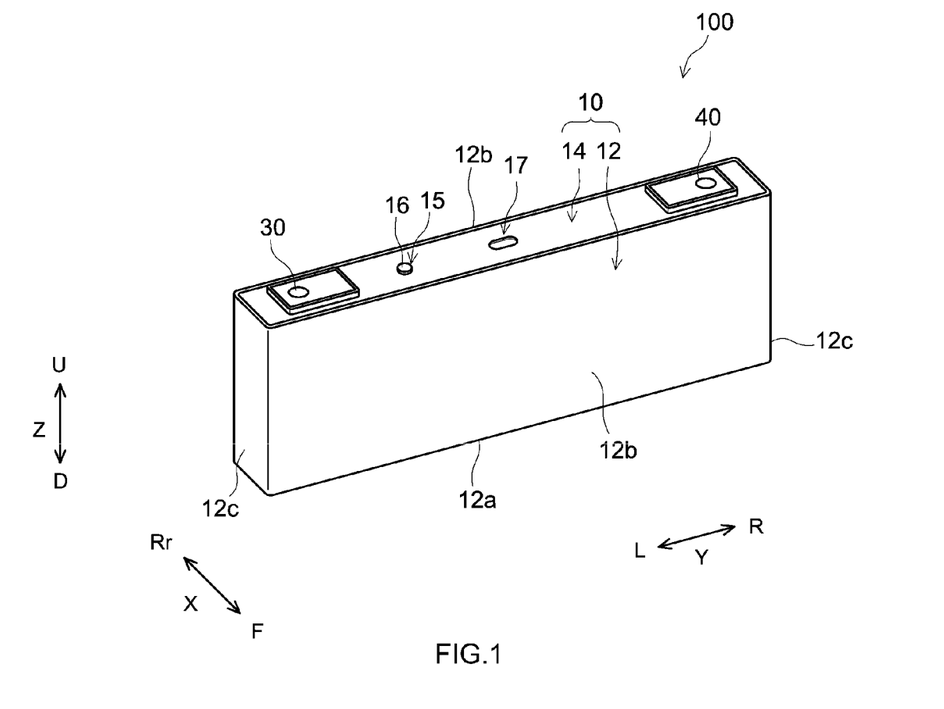
FIG. 1 is a perspective view schematically showing a secondary battery of an object to be manufactured of the manufacturing method in accordance with one embodiment.
Figure 2:
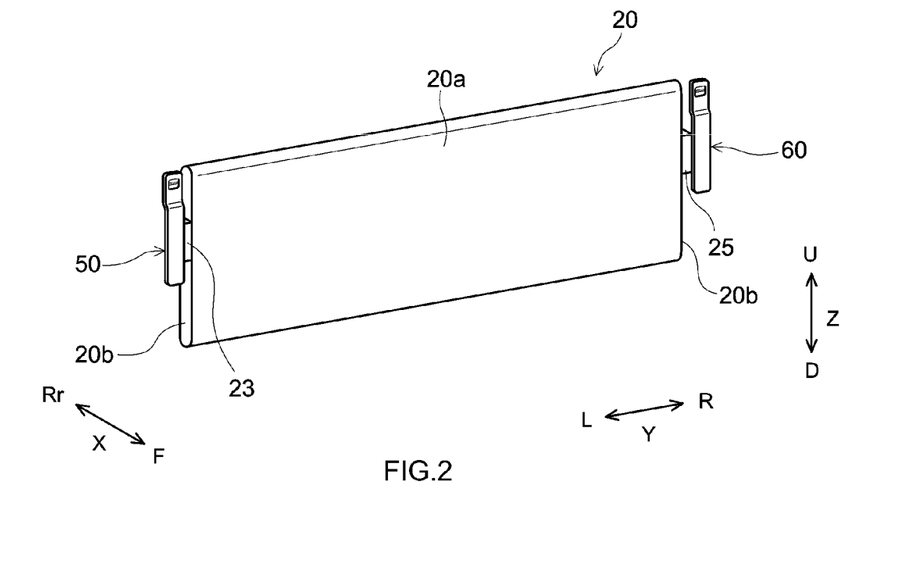
FIG. 2 is a perspective view schematically showing an electrode body including a current collector mounted therein.
Figure 3:
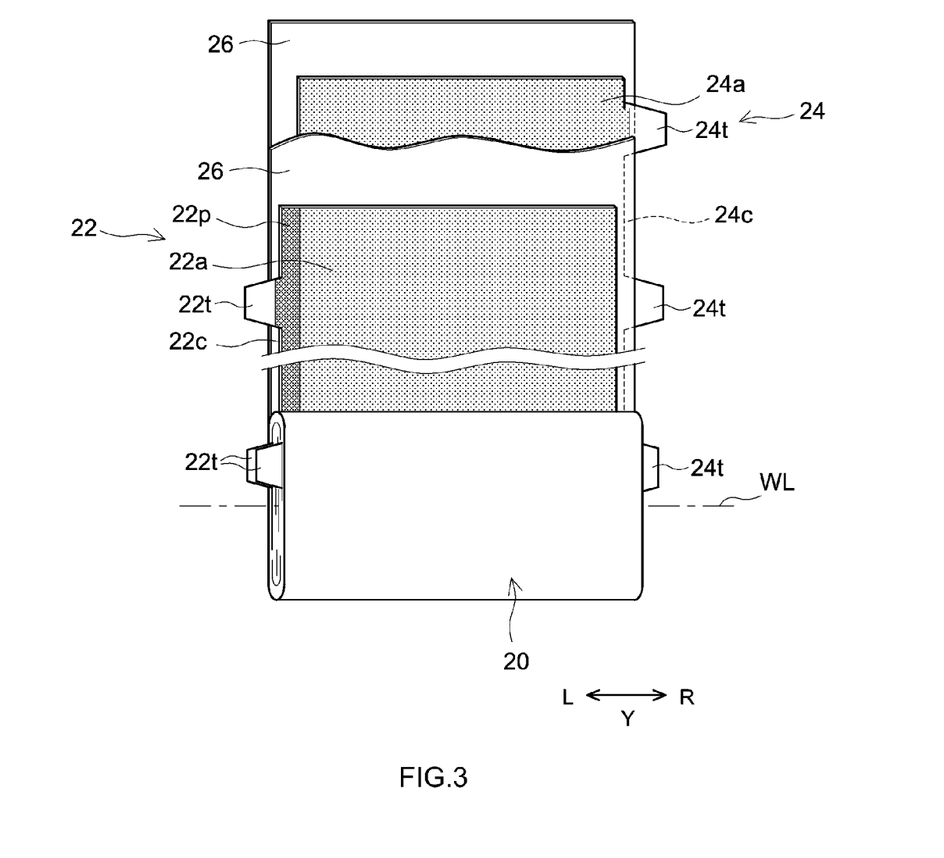
FIG. 3 is a schematic view showing a configuration of the electrode body.

FIG. 1 is a perspective view schematically showing a secondary battery of an object to be manufactured of the manufacturing method in accordance with one embodiment. FIG. 2 is a perspective view schematically showing an electrode body including a current collector mounted therein. FIG. 3 is a schematic view showing a configuration of an electrode body in accordance with one embodiment. A secondary battery 100 shown in FIG. 1 includes a battery case 10, an electrode body 20 (see FIGS. 2 and 3), and an electrolyte. The secondary battery 100 is a lithium ion secondary battery in this embodiment.

The battery case 10 is a housing for accommodating the electrode body 20 and the electrolyte in this embodiment. The battery case 10 is herein in a flat shape, and has an outward shape of a bottomed rectangular parallelepiped shape (rectangular shape). The material for the battery case 10 may be the same as those conventionally used, and has no particular restriction. The battery case 10 is preferably made of a metal, and is more preferably made of, for example, aluminum, an aluminum alloy, iron, or an iron alloy.

The battery case 10 includes an exterior body 12 having an opening, and a sealing body (lid body) 14 for blocking the opening. The exterior body 12 includes, as shown in FIG. 1, a bottom part 12a in a planar rectangular shape, a pair of mutually opposing first side walls 12b extending in the height direction Z from a pair of mutually opposing sides of the bottom part 12a, and a pair of mutually opposing second side walls 12c extending in the height direction Z from a pair of mutually opposing sides of the bottom part 12a. In this embodiment, the first side walls 12b are long side walls extending from a pair of opposing long sides of the bottom part 12a. Whereas, the second side walls 12c are short side walls extending from a pair of opposing short sides of the bottom part 12a. In this embodiment, the area of the second side wall 12c is smaller than the area of the first side wall 12b. Although not particularly shown, the bottom part 12a is opposed to the opening. The sealing body 14 seals the opening of the exterior body 12. The sealing body 14 is opposed to the bottom part 12a of the exterior body 12. The sealing body 14 is in a generally rectangular shape in a plan view. The battery case 10 is integrated by joining of the sealing body 14 with the peripheral edge of the opening of the exterior body 12. The battery case 10 is airtightly sealed (hermetically sealed).

The sealing body 14 is provided with a solution introduction port 15 and a gas discharge valve 17. The solution introduction port 15 is for introducing an electrolyte after mounting the sealing body 14 on the exterior body 12. The solution introduction port 15 is sealed by a sealing member 16. A gas discharge valve 17 is a thin-walled part configured so as to rupture when the pressure in the battery case 10 becomes equal to, or larger than a prescribed value, and to discharge the gas in the battery case 10 to the outside.

To the sealing body 14, a positive electrode terminal 30 and a negative electrode terminal 40 are respectively mounted. The positive electrode terminal 30 is arranged on one side (on the left side of FIG. 1) in the width direction Y of the sealing body 14. The positive electrode terminal 30 is electrically connected with a positive electrode sheet 22 of the electrode body 20 via a positive electrode current collector 50 (see FIGS. 2 and 3). For the positive electrode terminal 30, for example, aluminum is used. The negative electrode terminal 40 is arranged on the other side (on the right side of FIG. 1) in the width direction Y of the sealing body 14. The negative electrode terminal 40 is electrically connected with a negative electrode sheet 24 of the electrode body 20 via a negative electrode current collector 60 (see FIGS. 2 and 3). For the negative electrode terminal 40, for example, copper is used.

The electrolyte is, for example, a nonaqueous electrolyte. The electrolyte includes, for example, a nonaqueous solvent and a support salt. As the nonaqueous solvent and the support salt, various solvents for use in the electrolyte of this kind of secondary battery (herein, a lithium ion secondary battery) can be used without particular restriction. Examples of the nonaqueous solvent may include various carbonates such as ethylene carbonate (EC), diethyl carbonate (DEC), dimethyl carbonate (DMC), and ethyl methyl carbonate (EMC). As the support salt, for example, a lithium salt such as $LiPF_6$ can be used. The electrolyte may include, if required, conventionally known additives such as a film forming agent; a thickener; and a dispersant.

The secondary battery 100 includes, for example, one or a plurality of (two or more, three or more, or five or more, for example, three) electrode bodies 20. Although not particularly shown, one or a plurality, of electrode bodies 20 are arranged in the inside of the exterior body 12 while being covered with an electrode body holder made of a sheet made of a resin such as polyethylene (PE).

The electrode body 20 is a power generating element of the secondary battery 100, and includes a positive electrode sheet 22, a negative electrode sheet 24, and a separator 26 arranged between the positive electrode sheet 22 and the negative electrode sheet 24. As shown in FIG. 3, the electrode body 20 is a wound electrode body obtained by stacking a band-shaped positive electrode sheet 22 and a band-shaped negative electrode sheet 24 via a band-shaped separator 26, and winding them in the longitudinal direction. As shown in FIG. 2, the electrode body 20 has a pair of broad surfaces 20a, and a pair of end faces 20b in a width direction Y. The end face 20b is the lamination surface of the positive electrode sheet 22, the negative electrode sheet 24, and the separator 26, and is opened to the outside of the electrode body 20.

Although not particularly shown, the electrode body 20 is arranged in the inside of the exterior body 12 in such a direction that the winding shaft WL is in parallel with the width direction Y. In this embodiment, the electrode body 20 is arranged in the inside of the exterior body 12 in such a direction that the winding shaft WL is in parallel with the bottom part 12a. Further, in the inside of the exterior body 12, the broad surface 20a is opposed to the first side wall 12b. Whereas the end face 20b is opposed to the second side wall 12c.

The positive electrode sheet 22 has a long band-shaped positive electrode current collecting foil 22c (e.g., aluminum foil) and a positive electrode active material layer 22a formed on at least one surface of the positive electrode current collecting foil 22c. In this embodiment, the positive electrode active material layer 22a is provided in a band shape along the longitudinal direction of the positive electrode current collecting foil 22c (in FIG. 3, the longitudinal direction of the positive electrode sheet 22). Although not particularly restricted, on one side edge in the width direction Y of the positive electrode sheet 22, if required, a positive electrode protective layer 22p may be provided. Incidentally, for the materials forming the positive electrode active material layer 22a and the positive electrode protective layer 22p, those for use in this kind of secondary battery (in this embodiment, a lithium ion secondary battery) can be used without particular restriction, and do not characterize the technology herein disclosed. For this reason, a detailed description thereon herein will be omitted.

On one end (the left end of FIG. 3) in the width direction Y of the positive electrode current collecting foil 22c, a plurality of positive electrode tabs 22t are provided. The plurality of positive electrode tabs 22t respectively protrude toward one side (the left side of FIG. 3) in the width direction Y. The plurality of positive electrode tabs 22t are provided at intervals (intermittently) along the longitudinal direction of the positive electrode sheet 22. The positive electrode tab 22t is a part of the positive electrode current collecting foil 22c, and is a portion of the positive electrode current collecting foil 22c at which the positive electrode active material layer 22a and the positive electrode protective layer 22p are not formed (current collecting foil exposed part). For example, the plurality of positive electrode tabs 22t are stacked at one end in the width direction Y (the left end of FIG. 3), and form a positive electrode tab group 23 (see FIG. 2). As shown in FIG. 2, the positive electrode tab group 23 is joined with the positive electrode current collector 50.

In this embodiment, the width of the positive electrode active material layer 22a in the transverse direction of the positive electrode sheet 22 (the width direction Y of FIG. 3) (which will be hereinafter also referred to as simply "the width of the positive electrode active material layer 22a") is 20 cm or more. The width of the positive electrode active material layer 22a may be, for example, 25 cm or more. The width of the positive electrode active material layer 22a may be, for example, 40 cm or less, and may be 30 cm or less. Incidentally, in the embodiment shown in FIG. 3, the width of the positive electrode active material layer 22a is smaller than any of the width of the following negative electrode active material layer 24a, and the width of the separator 26 (the length in the transverse direction of the separator 26).

The negative electrode sheet 24 has along band-shaped negative electrode current collecting foil 24c (e.g., copper foil), and a negative electrode active material layer 24a formed on at least one surface of the negative electrode current collecting foil 24c. In this embodiment, the negative electrode active material layer 24a is provided in a band shape along the longitudinal direction of the negative electrode current collecting foil 24c (in FIG. 3, the longitudinal direction of the negative electrode sheet 24). Incidentally, for the materials forming the negative electrode active material layer 24a, those for use in this kind of secondary battery (in this embodiment, a lithium ion secondary battery) can be used without particular restriction, and do not characterize the technology herein disclosed. For this reason, a detailed description thereon herein will be omitted.

At one end in the width direction Y of the negative electrode current collecting foil 24c (the right end of FIG. 3), a plurality of negative electrode tabs 24t are provided. The plurality of negative electrode tabs 24t protrude toward one side in the width direction Y (the right side of FIG. 3). The plurality of negative electrode tabs 24t are provided at intervals (intermittently) along the longitudinal direction of the negative electrode sheet 24. The negative electrode tab 24t is herein a part of the negative electrode current collecting foil 24c, and is a portion of the negative electrode current collecting foil 24c at which the negative electrode active material layer 24a is not formed (current collecting foil exposed part). For example, the plurality of negative electrode tabs 24t are stacked at one end in the width direction Y (the right end of FIG. 3), and form a negative electrode tab group 25 (see FIG. 2). As shown in FIG. 2, the negative electrode tab group 25 is joined with the negative electrode current collector 60.

In this embodiment, the width of the negative electrode active material layer 24a in the transverse direction of the negative electrode sheet 24 (the width direction Y of FIG. 3) (which will be hereinafter also referred to as simply "the width of the negative electrode active material layer 24a") is 20 cm or more. The width of the negative electrode active material layer 24a may be, for example, 25 cm or more. The width of the negative electrode active material layer 24a may be, for example, 40 cm or less, and may be 30 cm or less. Incidentally, in the embodiment shown in FIG. 3, the width of the negative electrode active material layer 24a is larger than the width of the positive electrode active material layer 22a. Further, the width of the negative electrode active material layer 24a is smaller than the width of the separator 26 (the length in the transverse direction of the separator 26).

The separator 26 is a member for insulating the positive electrode active material layer 22a of the positive electrode sheet 22 and the negative electrode active material layer 24a of the negative electrode sheet 24. The separator 26 forms the outer surface of the wound electrode body 20. As the separator 26, for example, a porous sheet made of resin including a polyolefin resin such as polyethylene (PE) or polypropylene (PP).

In this embodiment, adhesion layers are provided on both surfaces of the separator 26. In this embodiment, the adhesion layer bonds the positive electrode sheet 22 and the separator 26, and bonds the negative electrode sheet 24 and the separator 26. Incidentally, the adhesion layer is not necessarily provided on both surfaces of the separator 26. In another embodiment, the adhesion layer is provided on one surface of the separator 26. Alternatively, in a still other embodiment, the adhesion layer is not provided on the separator 26.

The adhesion layer is, for example, a layer including a resin binder. As the resin binders, the resin materials for use in this kind of application can be used without particular restriction. Examples of such a resin material may include polyvinylidene fluoride (PVDF), and acrylic resins. The adhesion layer may include, for example, an inorganic filler other than the resin binder. As the inorganic filler, inorganic particles for use in this kind of application can be used without particular restriction. Examples of such an inorganic particle may include, alumina, boehmite, aluminum hydroxide, and titania.

Incidentally, the manufacturing process of a secondary battery including an electrolyte has, for example, reducing the pressure in the battery case, introducing an electrolyte into the battery case while being reduced in pressure, and impregnating an electrode body with the electrolyte introduced in the battery case. As described above, by reducing the pressure in the battery case, it is possible to exhaust a gas from the inside of the electrode body and the inside of the battery case. Further, for the impregnation of the electrode body with the electrolyte, for example, the inside of the battery case is communicated with an external atmosphere, so that a differential pressure is caused between inside and outside the electrode body in the battery case. At this step, for example, the pressure outside the electrode body is higher than the pressure inside the electrode body. For this reason, based on such a differential pressure, the electrolyte is impregnated into the electrode body. However, impregnation of the electrolyte into the electrode body reduces the space in the electrode body. For this reason, the pressure in the electrode body is increased, and the pressure outside the electrode body is decreased. In that way, the differential pressure is relaxed with an elapse of the impregnation time.

As described above, when the differential pressure between inside and outside the electrode body is relaxed, the electrolyte comes to be impregnated into the electrode body by capillarity. The driving force of impregnation due to capillarity is smaller than the driving force of impregnation due to a differential pressure. For this reason, when a shift from impregnation due to a differential pressure to impregnation due to capillarity is caused, the impregnation efficiency of the electrolyte into the electrode body is reduced, thereby requiring a longer time until the completion of impregnation. In recent years, with spread of a secondary battery, the secondary battery has tended to be increased in size. This has resulted in a stronger demand for the improvement of the impregnation efficiency of the electrolyte into the electrode body. The present inventors conducted a study on provision of a difference in pressure between inside and outside of the electrode body again during the period in which the electrolyte is impregnated in the manufacturing process of a secondary battery.

Figure 4:
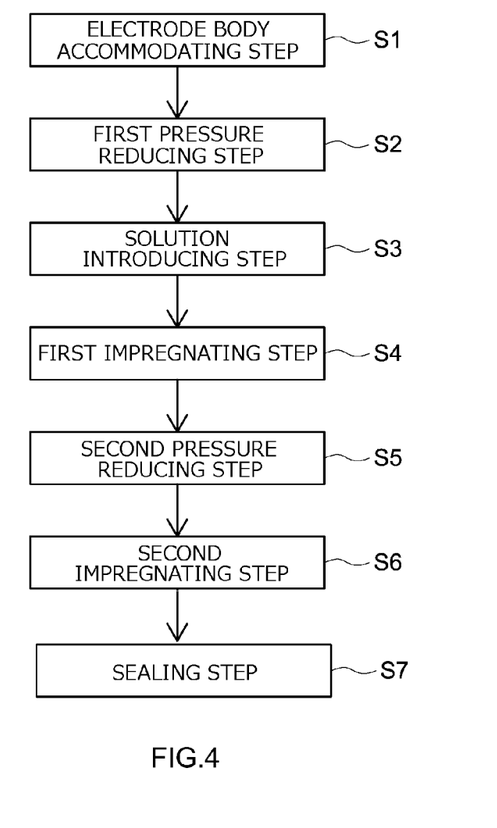
FIG. 4 is a flowchart of a manufacturing method in accordance with one embodiment.
Figure 5:
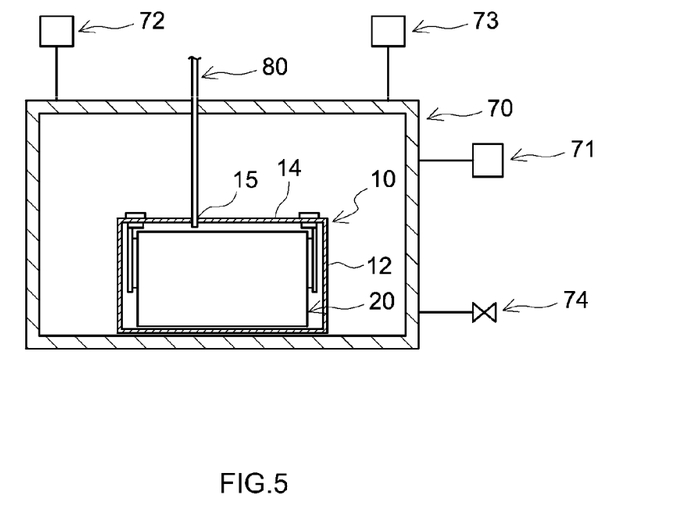
FIG. 5 is a schematic view for illustrating a part of the manufacturing steps of the manufacturing method in accordance with one embodiment.

FIG. 4 is a flowchart of a manufacturing method in accordance with one embodiment. FIG. 5 is a schematic view for illustrating a part of the manufacturing steps of the manufacturing method in accordance with one embodiment. The method for manufacturing the secondary battery 100 in this embodiment has, as shown in FIG. 4, an electrode body accommodating step S1, a first pressure reducing step S2, a solution introducing step S3, a first impregnating step S4, a second pressure reducing step S5, a second impregnating step S6, and a sealing step S7. The following description will be given by appropriately referring to FIGS. 1 to 5.

In the electrode body accommodating step S1, for example, an electrode body 20 is accommodated in a battery case 10. In this embodiment, first, the electrode body 20 is manufactured by a conventionally known method. Then, a positive electrode current collector 50 is mounted to a positive electrode tab group 23 of the electrode body 20. Further, a negative electrode current collector 60 is mounted to a negative electrode tab group 25. Then, a positive electrode terminal 30 and a negative electrode terminal 40 are mounted at a sealing body 14. The electrode terminals are joined with electrode current collectors of the respectively corresponding same polarities by a conventionally known method (e.g., ultrasonic joining, resistance welding, or laser welding), respectively. Then, the electrode body 20 is accommodated in an electrode body holder made of a resin. Then, the electrode body 20 covered with the electrode body holder is inserted into an exterior body 12. In this state, the sealing body 14 is superimposed on the opening of the exterior body 12, which are welded, thereby sealing the exterior body 12.

In the first pressure reducing step S2, for example, with the electrode body 20 accommodated in the battery case 10, the pressure in the battery case 10 is reduced. In this embodiment, first, the battery case 10 accommodated in the inside of the electrode body 20 in the electrode body accommodating step S1 is arranged in a chamber 70 as shown in FIG. 5. The chamber 70 is connected with, for example, a vacuum pump 71. Then, the switch of the vacuum pump 71 is turned on, thereby reducing the pressure in the chamber 70. The temperature of the inside of the chamber 70 can be set at, for example, ordinary temperatures.

The inside of the battery case 10 in the first pressure reducing step S2 is reduced in pressure, for example, to a reduced pressure state enough not to cause a damage in the battery case 10 (e.g., enough not to damage the gas discharge valve 17). In order to more reduce the amount of gas remaining in the inside of the electrode body 20, the inside of the battery case 10 is in a reduced pressure state of, for example, preferably 5 kPa or less, more preferably 4 kPa or less, further preferably 3 kPa or less, and desirably closer to 0 kPa in terms of absolute pressure.

In this embodiment, the pressure in the battery case 10 can be defined by, for example, the internal pressure of the chamber 70. The chamber 70 is, as shown in FIG. 5, connected with a pressure sensor 72. In this embodiment, the internal pressure of the chamber 70 is measured by the pressure sensor 72.

In the first pressure reducing step S2, for example, after the inside of the battery case 10 reaches a desirable reduced pressure state, such a reduced pressure state is preferably kept for a prescribed period. The prescribed period is, for example, preferably 30 seconds or more, more preferably 60 seconds or more, and further preferably 100 seconds or more in order to more reduce the amount of the gas remaining in the inside of the electrode body 20. Although not particularly restricted, the prescribed period is, for example, desirably 600 seconds or less, and can be set at 300 seconds or less from the viewpoint of reduction of the facility scale, and the viewpoint of cost reduction. Incidentally, as shown in FIG. 5, the chamber 70 is connected with a timer 73. In this embodiment, the timer 73 measures the keeping period, and the period in each step described later.

At the solution introducing step S3, an electrolyte is introduced into the battery case 10. In this embodiment, after the first pressure reducing step S2, with the inside of the battery case 10 being reduced in pressure, an electrolyte is introduced into the inside of the battery case 10 via the solution introduction port 15. For example, a pipe 80 connected with the chamber 70 is connected with the solution introduction port 15 of the battery case 10, so that the electrolyte is introduced into the exterior body 12. The pipe 80 is, for example, a solution introducing pipe, and is connected with the supply source of the electrolyte (e.g., a tank for accommodating the electrolyte). After the start of introduction of the electrolyte, with at least a part of the electrode body 20 impregnated with the electrolyte, the liquid introduction is stopped. At the solution introducing step S3, a secondary battery assembly including the electrode body 20, the electrolyte, and the battery case 10 is constructed. In the present specification, the term "secondary battery assembly" denotes, for example, a construction having the electrode body 20, the electrolyte, and the battery case 10, and not undergoing initial charging.

In the first impregnating step S4, for example, the electrode body 20 is impregnated with an electrolyte. In this embodiment, after the solution introducing step S3, first, the inside of the battery case 10 and an external atmosphere are communicated with each other. For example, after the stop of introduction of the electrolyte via the pipe 80, the switch of the vacuum pump 71 connected with the chamber 70 is turned off, so that the valve 74 is opened.

With this procedure, the atmosphere in the chamber 70 and an external atmosphere can be communicated with each other. At this step, for example, the pipe 80 may be removed from the solution introduction port 15, thereby opening the solution introduction port 15. Via the opened solution introduction port 15, the inside of the battery case 10 can be opened to an external atmosphere. By opening the inside of the battery case 10 to an external atmosphere, it is possible to increase the pressure in the battery case 10. The internal pressure of the battery case 10 is increased to, for example, around the atmospheric pressure.

Then, in this embodiment, with the inside of the battery case 10 and an external atmosphere being communicated with each other, the secondary battery assembly is allowed to stand still for 10 hours or more. During such still standing, the electrolyte introduced into the battery case 10 is impregnated into the electrode body 20. In order to improve the impregnation efficiency of the electrolyte into the electrode body 20, the still standing period is preferably 15 hours or more, and more preferably 20 hours or more. From the view point of reduction of the facility scale, and the viewpoint of cost reduction, the still standing period is, for example, preferably 50 hours or less, and more preferably 40 hours or less. In a preferred one aspect, the still standing period is 10 hours or more and 30 hours or less.

Although not particularly restricted, in the first impregnating step S4, appropriately using various sensors for use in this kind of application, the impregnation state of the electrolyte into the electrode body 20 can be monitored. In the first impregnating step S4, for example, in consideration of making the differential pressure between inside and outside the electrode body 20 after carrying out the following second pressure reducing step S5 preferable for implementing the effects of the technology herein disclosed, the secondary battery assembly may be allowed to stand still until the impregnation rate of the electrolyte into the electrode body 20 becomes 50% or more. On the other hand, for example, in consideration of the improvement of the impregnation efficiency of the electrolyte into the electrode body 20, and the suppression of dissolution of the metal (e.g., copper) included in the secondary battery assembly, the impregnation rate can be set at 95% or less. In a preferred one aspect, at the first impregnating step S4, the secondary battery assembly is allowed to stand still so that the impregnation rate may become 70% to 90% or less.

At the second pressure reducing step S5, for example, the inside of the battery case 10 after the first impregnating step S4 is reduced in pressure. In this embodiment, at the first impregnating step S4, after the secondary battery assembly is allowed to stand still for 10 hours or more, the second pressure reducing step S5 is carried out. In this embodiment, the valve 74 opened at the first impregnating step S4 is closed, and the switch of the vacuum pump 71 is turned on, thereby reducing the pressure in the chamber 70.

The inside of the battery case 10 at the second pressure reducing step S5 is reduced in pressure to a reduced pressure state, for example, enough to prevent the electrolyte introduced into the battery case 10 from boiling at ordinary temperatures. In consideration of the reduction of the amount of the gas remaining in the inside of the electrode body 20, and the suppression of the volatilization of the electrolyte, for example, the inside of the battery case 10 may be desirably reduced in pressure down to 5 kPa to 50 kPa, and is preferably reduced in pressure to 10 kPa to 20 kPa in terms of absolute pressure.

At the second pressure reducing step S5, for example, after the inside of the battery case 10 reaches a desirable reduced pressure state, such a reduced pressure state is kept for a prescribed period. The prescribed period is, for example, preferably 100 seconds or more, more preferably 200 seconds or more, and further preferably 300 seconds (5 minutes) or more in order to more reduce the amount of the gas remaining in the inside of the electrode body 20. Although not particularly restricted, from the viewpoint of prevention of volatilization of the electrolyte, the viewpoint of reduction of the facility scale, and the viewpoint of cost reduction, the prescribed period may be desirably, for example, 1800 seconds (30 minutes) or less, and can be set at 1200 seconds (20 minutes) or less.

Although the pressure reduction and the keeping thereof at the second pressure reducing step S5 may be carried out one time, they may be repeated a plurality of times in order to better implement the effects of the technology herein disclosed. The number of such repetitions may be set at, for example, two to five. When the pressure reduction and the keeping are repeated a plurality of times, for example, before the repetition (i.e., between the keeping and the next pressure reduction), a state may be desirably achieved in which the inside of the battery case 10 and an external atmosphere are communicated with each other for 10 seconds to 180 seconds in consideration of the improvement of the impregnation efficiency of the electrolyte into the electrode body 20, and the suppression of the reduction of the productivity of the secondary battery 100. Incidentally, when the pressure reduction and the keeping are repeated a plurality of times, the period in which the inside of the battery case 10 is rendered in a desirable reduced pressure state may be desirably set at 20 minutes to 50 minutes in total although not particularly restricted.

At the second impregnating step S6, for example, the electrode body 20 is impregnated with the electrolyte. In this embodiment, after the second pressure reducing step S5 (when the pressure reduction and the keeping are repeated a plurality of times, after the final pressure reduction), with the inside of the battery case 10 and an external atmosphere being communicated with each other, the secondary battery assembly is allowed to stand still for a prescribed period.

The prescribed period may be desirably set at roughly 5 hours to 40 hours (e.g., 10 hours to 30 hours).

At the sealing step S7, for example, the battery case 10 is sealed. In this embodiment, after the second impregnating step S6, using a sealing member 16, the solution introduction port 15 of the secondary battery assembly is sealed. For example, as the sealing member 16, a sealing stopper made of a metal is used, and the sealing stopper is fitted into the solution introduction port 15. Then, with the solution introduction port 15 blocked by the sealing member 16, laser welding, or the like is performed, thereby sealing the solution introduction port 15.

After the sealing step S7, for example, the secondary battery assembly is subjected to initial charging and an aging treatment under prescribed conditions. As a result, a secondary battery 100 in a usable state can be obtained.

Although the secondary battery 100 manufactured by the manufacturing method herein disclosed can be used for various applications, it can be preferably used as a power source for a motor (driving power supply) to be mounted on a vehicle such as a passenger car or a truck. The kind of the vehicle has no particular restriction. Examples thereof may include a plug-in hybrid vehicle (PHEV), a hybrid vehicle (HEV), and an electric vehicle (BEV).

In the embodiment, a description has been given to one example of a method for manufacturing a secondary battery including the electrode body 20 including the positive electrode sheet 22, the negative electrode sheet 24, and the separator 26 arranged between the positive electrode sheet 22 and the negative electrode sheet 24, the electrolyte, and the battery case 10 for accommodating the electrode body 20 and the electrolyte. The manufacturing method has the solution introducing step S3 of introducing the electrolyte into the battery case 10, and the second pressure reducing step S5 of reducing the pressure in the battery case 10 after the solution introducing step S3. After an elapse of 10 hours or more after the solution introducing step S3, the second pressure reducing step S5 is carried out.

Figure 6:
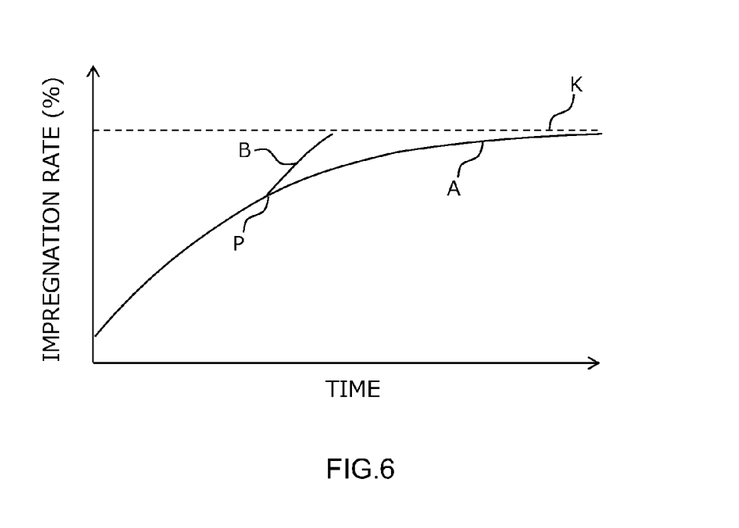
FIG. 6 is a graph illustrating a change with time in the impregnation rate of the electrolyte into the electrode body.

Regarding the mechanism in which the impregnation efficiency of the electrolyte into the electrode body 20 has been improved in the manufacturing method herein disclosed, the present inventors consider as follows (for the reference numerals and signs, appropriately see FIGS. 1 to 6). However, it is not intended that the present invention is limited to the mechanism described below. Incidentally, FIG. 6 is a graph for illustrating the change with time in the impregnation rate of the electrolyte into the electrode body. In the same drawing, the horizontal axis indicates the lapse of time, and the horizontal axis indicates the impregnation rate (%). A dotted line K indicates the impregnation rate of 100% of the electrolyte in the electrode body 20.

With the following method for manufacturing a secondary battery, by the first pressure reducing step S2, a gas is exhausted from the electrode body 20, and the inside of the battery case 10 is reduced in pressure. At the solution introducing step S3, an electrolyte is introduced into the battery case 10 while being reduced in pressure after the first pressure reducing step S2. After the introduction, the inside of the battery case 10 and an external atmosphere are communicated with each other. This causes a difference in pressure between inside and outside the electrode body 20 in the battery case 10. The difference in pressure causes the electrolyte to be impregnated into the electrode body 20. As indicated with a curve A in FIG. 6, the impregnation rate of the electrolyte in the electrode body 20 increases with an elapse of time. However, the difference in pressure caused between inside and outside the electrode body 20 due to the impregnation of the electrolyte into the electrode body 20 is resolved with an elapse of time. In that case, the electrolyte comes to be impregnated into the electrode body 20 by capillarity. With the manufacturing method, by carrying out the second pressure reducing step S5, it is possible to exhaust the gas left in the electrode body 20 to the outside, and increase the difference in pressure between inside and outside the electrode body 20. An increase in difference in pressure between inside and outside the electrode body 20 enables the electrolyte to be impregnated into the electrode body 20 by the differential pressure. With the manufacturing method, after an elapse of 10 hours or more after the solution introducing step S3, the second pressure reducing step S5 is carried out (the timing indicated with a point P in FIG. 6). As a result, as indicated with a curve B, the impregnation rate of the electrolyte into the electrode body 20 can be increased, which can improve the impregnation efficiency.

Further, with the manufacturing method, the electrode body 20 is a wound electrode body obtained by winding the band-shaped positive electrode sheet 22, and the band-shaped negative electrode sheet 24 via the band-shaped separator 26. By adopting a wound electrode body as the electrode body 20, it is possible to enhance the productivity of the secondary battery 100. At this step, at the electrode body 20, mainly from the end face 20*b*, a gas is exhausted to outside the electrode body 20, and the electrolyte is impregnated into the electrode body 20. The wound electrode body has a configuration which may require a longer time for the impregnation of the electrolyte. For this reason, the technology herein disclosed is preferably applied thereto.

Further, with the manufacturing method, the positive electrode sheet 22 includes a positive electrode current collecting foil 22*c*, and a positive electrode active material layer 22*a* formed on the positive electrode current collecting foil 22*c*. The width of the positive electrode active material layer 22*a* in a transverse direction (the width direction Y in FIG. 3) of the positive electrode sheet 22 is 20 cm or more. By setting the width of the positive electrode active material layer 22*a* within the range, it is possible to make the secondary battery 100 a higher-capacity secondary battery. Further, of the electrode body 20, the overlapping portion of the positive electrode active material layer 22*a*, the negative electrode active material layer 24*a*, and the separator 26 has less gap in the thickness direction of the electrode body 20 than that of other portions (e.g., the overlapping portion of only the separator 26, and the overlapping portion of the separator 26 and the negative electrode active material layer 24*a*), and can be a portion taking time for impregnation of the electrolyte. The electrode body 20 including the positive electrode sheet 22 with the width of the positive electrode active material layer 22*a* falling within the range has a configuration which may require a longer time for impregnation of the electrolyte. For this reason, the technology herein disclosed is preferably applied thereto.

Further, with the manufacturing method, adhesion layers are provided on both surfaces of the separator 26. The adhesion layer bonds the positive electrode sheet 22 and the separator 26, and bonds the negative electrode sheet 24 and the separator 26. Provision of the adhesion layers on both the surfaces of the separator 26 can suppress an increase in thickness of the electrode body 20, and can improve the productivity. The electrode body 20 including the separator 26 provided with the adhesion layers has a configuration which may take a longer time for impregnation of the electrolyte. For this reason, the technology herein disclosed is preferably applied thereto.

Further, the manufacturing method includes, before the solution introducing step S3, reducing the pressure in the battery case 10 down to 5 kPa or less in terms of absolute pressure (e.g., the first pressure reducing step S2). When, before the introduction of the electrolyte, the pressure in the battery case is reduced down to the pressure range, the differential pressure between inside and outside the electrode body 20 in the battery case 10 can be made preferable for the electrolyte to be impregnated into the electrode body 20. For this reason, as a result of this, it is possible to preferably implement the effects of the technology herein disclosed.

Further, with the manufacturing method, at the second pressure reducing step S5, the inside of the battery case 10 is reduced in pressure down to 5 kPa to 50 kPa in terms of absolute pressure. As a result of this, it is possible to preferably implement the effects of the technology herein disclosed.

Below, a description will be given to Test Example regarding the present invention. Incidentally, it is not intended that the contents of the Test Example described below limits the present invention.

Example 1

Electrode Body Accommodating Step $LiN_{1/3}Co_{1/3}Mn_{1/3}O_2$ as a positive electrode active material, acetylene black (AB) as a conductive material, and polyvinylidene fluoride (PVDF) as a binder were mixed at a mass ratio of positive electrode active material:AB:PVDF=94:3:3 in N-methyl pyrrolidone (NMP) using a planetary mixer, thereby preparing a positive electrode active material layer forming slurry. The slurry was applied onto both the surfaces of band-shaped aluminum foil, and was dried. Subsequently, this was pressed, thereby manufacturing a positive electrode sheet. The width of the positive electrode active material layer was 28.0 cm. Whereas, natural graphite (C) as a negative electrode active material, styrene butadiene rubber (SBR) as a binder, and carboxymethyl cellulose (CMC) as a thickener were mixed at a mass ratio of C: SBR:CMC=98:1:1 in ion exchanged water, thereby preparing a negative electrode active material layer forming slurry. The slurry was applied onto both the surfaces of band-shaped copper foil, and was dried. Subsequently, this was pressed, thereby manufacturing a negative electrode sheet. The width of the negative electrode active material layer was 28.5 cm. Further, two band-shaped separators (porous polyolefin sheets each of a three-layered structure of PP/PE/PP) were prepared. The width of the separator was 29.0 cm. The separator was configured such that adhesion layers were formed on both the surfaces of the separator. The adhesion layer was an adhesion layer including an alumina powder and polyvinylidene fluoride (PVDF). The manufactured positive electrode sheet and negative electrode sheet and the prepared two separators were stacked one on another, and were wound, thereby manufacturing a tubular laminated body. The tubular laminated body was squashed and collapsed in the stacking direction, thereby manufacturing a flat-shaped wound electrode body. To the positive electrode sheet and the negative electrode sheet of the manufactured wound electrode body, electrode terminals were respectively mounted by welding. This was accommodated in a battery case having a solution introduction port. The battery case had a pair of opposing broad surfaces each with a width of 31 cm, a height of 10 cm, and a thickness of 4 cm.

First Pressure Reducing Step

As described above, the battery case accommodating the wound electrode body was arranged in a chamber. The chamber was connected with a vacuum pump, a pressure sensor, and a timer. The switch of the vacuum pump was turned on, and the inside of the chamber was reduced in pressure down to 4 kPa abs for 10 seconds. Such a reduced pressure state was kept for 120 seconds.

Solution Introducing Step

After the first pressure reducing step, 310 cc of electrolyte was introduced into the battery case with the pressure being reduced via the solution introduction port of the battery case for 15 seconds, thereby manufacturing a secondary battery assembly.

First Impregnating Step

As described above, after introducing the electrolyte into the battery case, the valve provided at the chamber was opened, so that the inside of the battery case and an external atmosphere were communicated with each other. The secondary battery assembly was allowed to stand still with the inside of the battery case and an external atmosphere being communicated with each other for 24 hours.

Second Pressure Reducing Step

After the 24-hour still standing, the valve was closed. Then, the switch of the vacuum pump was turned on, and the inside of the chamber was reduced in pressure under first conditions. The first conditions were as follows: after reducing the pressure in the chamber down to 10 kPa for 10 minutes, the valve was opened, and I-hour still standing was performed; subsequently, the pressure reduction and the still standing were repeated three times.

Second Impregnating Step

After repeating the pressure reduction and the still standing three times, the secondary battery assembly was allowed to stand still with the inside of the battery case and an external atmosphere being communicated with each other until the completion of the impregnation of the electrolyte into the wound electrode body. The time from the first impregnating step start (i.e., immediately after the solution introducing step) to the completion of impregnation is shown in the corresponding column of Table 1. The impregnation time shown in Table 1 is the total time of the time of the first impregnating step, the time required for carrying out the second pressure reducing step, and the time of the second impregnating step.

The completion of impregnation was determined by disassembling the secondary battery assembly, and observing that the tips of the electrolyte impregnated from both the ends in the width direction of the wound electrode body meet in the vicinity of the central part in the same direction. Incidentally, previously, the time of completion of impregnation is estimated. From at the time shorter than the estimated impregnation time, the disassembly of the secondary battery assembly was started. The impregnation time when all the three secondary battery assemblies equalized in timing of disassembly were determined as "impregnation completed" was recorded.

Example 2

At the first impregnating step, the secondary battery assembly was allowed to stand still with the inside of the battery case and an external atmosphere being communicated with each other for 36 hours. After the 36-hour still standing, the second pressure reducing step was carried out. The present Example was carried out in the same manner as in Example 1 except for this.

Example 3

In the first impregnating step, a secondary battery assembly was allowed to stand still with the inside of the battery case and an external atmosphere being communicated with each other for 12 hours. After the 12-hour still standing, the second pressure reducing step was carried out. The present Example was carried out in the same manner as in Example 1 except for this.

Example 4

In the first impregnating step, a secondary battery assembly was allowed to stand still with the inside of the battery case and an external atmosphere being communicated with each other for 1 hour. After the 1-hour still standing, the second pressure reducing step was carried out. The present Example was carried out in the same manner as in Example 1 except for this.

Example 5

In the present Example, the second pressure reducing step was not carried out. The present Example was carried out in the same manner as in Example 1 except for this. Incidentally, the description "–" in the column "second pressure reducing step" of Table 1 represents non-practicing of the present step (the same also applies to Example 6). Further, at the impregnating step in the present Example, first and second have no distinction therebetween. For this reason, "–" is described in the column "first impregnating step" of Table 1. Further, the description of the column "impregnation time (time)" represents the period immediately after the solution introducing step to the completion of impregnation.

Example 6

In the present Example, the first impregnating step was not carried out. Immediately after introduction of an electrolyte into a battery case at the solution introducing step, the second pressure reducing step under second conditions was carried out. After the second pressure reducing step, the second impregnating step was carried out. The present Example was carried out in the same manner as in Example 1 except for this. The second conditions were as follows: the inside of the chamber is set in a pressurized state of 1000 kPa; and the pressurized state is held for 3 minutes; subsequently, the pressure is reduced down to 10 kPa; and the reduced pressure state is held for 10 minutes; subsequently, the chamber is allowed to stand still for 1 minute; then, the pressure reduction and the still standing are repeated three times.

Example 7

In the present Example, in the chamber, a device having an electrolyte temporarily storing layer for temporarily storing the electrolyte supplied from a supply source of the electrolyte (electrolyte storing tank), and a rotary disk was arranged. The secondary battery assembly was arranged on the rotary disk while being connected with the electrolyte temporarily storing layer. In this state, the first pressure reducing step was carried out. At the first pressure reducing step, the pressure was reduced down to 1 kPa for 15 seconds. The reduced pressure state was held for 60 seconds. After the first pressure reducing step, with the reduced pressure state in the battery case being held, the rotary disk of the device was rotated. Such rotation resulted in a state in which a centrifugal force of about 300 G was applied to the secondary battery assembly, and then the introduction of the electrolyte from the electrolyte temporarily storing layer into the secondary battery assembly was started. After starting the introduction of the electrolyte, the inside of the chamber was increased in pressure up to 1000 kPa. 310 cc of electrolyte was introduced for 60 seconds. Immediately after the introduction, the inside of the chamber was communicated with an external atmosphere. Immediately after the inside of the chamber became equal in pressure to an external atmosphere, the inside of the chamber was reduced in pressure down to 21.3 kPa. The reduced pressure state was held for 10 seconds. Subsequently, the inside of the chamber was communicated with an external atmosphere. In this state, the second impregnating step was carried out. After the second impregnating step, the rotation of the rotary disk was stopped. Incidentally, the present Example was carried out with appropriately referring to the manufacturing method disclosed in Japanese Patent Application Publication No. 2007-165170.

Example 8

At the first impregnating step, the secondary battery assembly was allowed to stand still with the inside of the battery case and an external atmosphere being communicated with each other for 10 minutes. After the 10-minute still standing, the second pressure reducing step was carried out. At the second pressure reducing step, the inside of the chamber was reduced in pressure down to 10 kPa. The reduced pressure state was held for 10 seconds. The present Example was carried out in the same manner as in Example 1 except for this. Incidentally, the present Example was carried out with appropriately referring to the manufacturing method disclosed in WO 2015/087618.

TABLE 1

|  | First pressure reducing step | Solution introducing step | First impregnating step | Second pressure reducing step | Impregnation time (hours) |
| --- | --- | --- | --- | --- | --- |
| Example 1 | Reduce pressure down to 4 kPa for 10 sec, and hold for 120 sec | Introduce 310 cc for 15 sec | 24 h | First conditions | 34 |
| Example 2 |  |  | 36 h |  | 44 |
| Example 3 |  |  | 12 h |  | 46 |
| Example 4 |  |  | 1 h |  | 54 |
| Example 5 |  |  | — | — | 55 |
| Example 6 |  |  | — | Second conditions | 52 |

TABLE 1-continued

|  | First pressure reducing step | Solution introducing step | First impregnating step | Second pressure reducing step | Impregnation time (hours) |
|---|---|---|---|---|---|
| Example 7 | Reduce pressure down to 1 kPa for 15 sec, and hold for 60 sec | Centrifuge at 300 G, and introduce 310 cc under pressurized state of 1000 kPa for 60 sec | — | Reduce pressure down to 21.3 kPa, and hold for 10 sec | 53 |
| Example 8 | Reduce pressure down to 4 kPa for 10 sec, and hold for 120 sec | Introduce 310 cc for 15 sec | 10 min | Reduce pressure down to 10 kPa, and hold for 10 sec | 55 |

Comparison between the results of Examples 1 to 3 and the results of Examples 4 to 8 indicated as follows: a method for manufacturing a secondary battery is carried out which has a solution introducing step of introducing an electrolyte into a battery case, and a pressure reducing step (herein, a second pressure reducing step) of reducing the pressure in the battery case after the solution introducing step, in which after an elapse of 10 hours or more after the solution introducing step, the pressure reducing step (herein, the second pressure reducing step is carried out), as a result, it is possible to shorten the impregnation time of the electrolyte into the electrode body (improve the impregnation efficiency of the electrolyte). From the results of Examples 1 to 3, it can be considered that, at the time point after 24 hours from the introduction, the impregnation of the electrolyte undergoes a shift from the impregnation due to the differential pressure between inside and outside the electrode body to the impregnation due to capillarity, resulting in the reduction of the impregnation rate.

From the comparison between the results of Example 5 and the results of Examples 6 to 8, its can be considered that with the battery case being pressurized, and with the battery case being applied with a centrifugal force, the impregnation efficiency of the electrolyte into the electrode body is improved. However, it is indicated as follows: when the second pressure reducing step is carried out at an appropriate timing, the effect of improving the impregnation efficiency can be better obtained.

Up to this point, the specific examples of the technology herein disclosed have been described in details. However, these are merely examples, and do not limit the scope of the appended claims. The technology described in the scope of the appended claims includes various modifications and changes of the specific examples shown up to this point.

For example, in the embodiment, before the solution introducing step S3, the first pressure reducing step S2 is carried out. However, not limited thereto, in other embodiments, the first pressure reducing step S2 can be omitted. Even when the first pressure reducing step S2 is omitted, by carrying out the second pressure reducing step S5, it is possible to cause a preferable differential pressure for impregnation of the electrolyte into the electrode body 20 between inside and outside the electrode body 20 in the battery case 10 during impregnation of the electrolyte. For this reason, the effects of the technology herein disclosed can be implemented.

What is claimed is:

1. A method for manufacturing a secondary battery,
the secondary battery comprising an electrode body comprising a positive electrode sheet, a negative electrode sheet, and a separator arranged between the positive electrode sheet and the negative electrode sheet,
an electrolyte, and
a battery case for accommodating the electrode body and the electrolyte,
the method comprising a solution introducing step of introducing the electrolyte into the battery case, and
a pressure reducing step of reducing a pressure in the battery case after the solution introducing step,
wherein
after an elapse of 10 hours or more after the solution introducing step, the pressure reducing step is carried out.

2. The manufacturing method according to claim 1
wherein the electrode body is a wound electrode body obtained by winding the positive electrode sheet in a band shape and the negative electrode sheet in a band shape via the separator in a band shape.

3. The manufacturing method according to claim 1,
wherein the positive electrode sheet comprises a positive electrode current collecting foil, and a positive electrode active material layer provided on the positive electrode current collecting foil, and
a width of the positive electrode active material layer in a transverse direction of the positive electrode sheet is 20 cm or more.

4. The manufacturing method according to claim 1,
wherein adhesion layers are provided on both surfaces of the separator, and
the adhesion layer bonds the positive electrode sheet and the separator, and bonds the negative electrode sheet and the separator.

5. The manufacturing method according to claim 1, comprising, reducing a pressure in the battery case down to 5 kPa or less in terms of absolute pressure, before the solution introducing step.

6. The manufacturing method according to claim 1,
wherein at the pressure reducing step after the solution introducing step, an inside of the battery case is reduced in pressure down to 5 kPa to 50 kPa in terms of absolute pressure.

* * * * *